(12) United States Patent
Marshall

(10) Patent No.: US 11,888,544 B2
(45) Date of Patent: Jan. 30, 2024

(54) SELECTION OF PHYSICS-SPECIFIC MODEL FOR DETERMINATION OF CHARACTERISTICS OF RADIO FREQUENCY SIGNAL PROPAGATION

(71) Applicant: Google LLC, Mountain View, CA (US)

(72) Inventor: Preston F. Marshall, Woodbridge, VA (US)

(73) Assignee: Google LLC, Mountain View, CA (US)

( * ) Notice: Subject to any disclaimer, the term of this patent is extended or adjusted under 35 U.S.C. 154(b) by 395 days.

(21) Appl. No.: 17/347,134

(22) Filed: Jun. 14, 2021

(65) Prior Publication Data

US 2022/0399946 A1 Dec. 15, 2022

(30) Foreign Application Priority Data

Jun. 14, 2021 (EP) .................................... 21179289

(51) Int. Cl.
*H04W 4/02* (2018.01)
*H04W 64/00* (2009.01)
(Continued)

(52) U.S. Cl.
CPC ......... *H04B 17/3912* (2015.01); *G06N 20/00* (2019.01); *H04B 17/3913* (2015.01); *H04W 24/06* (2013.01); *G06F 18/214* (2023.01)

(58) Field of Classification Search
CPC ............ H04B 17/3912; H04B 17/3913; G06N 20/00; H04W 24/06; G06F 18/214
See application file for complete search history.

(56) References Cited

U.S. PATENT DOCUMENTS

| 2018/0316555 A1* | 11/2018 | Salgueiro | ................ H04L 41/16 |
| 2019/0150006 A1* | 5/2019 | Yang | ........................ G06N 3/08 |
| | | | 455/422.1 |

(Continued)

FOREIGN PATENT DOCUMENTS

| WO | 2011051537 | 5/2011 |
| WO | 2020111748 | 6/2020 |

OTHER PUBLICATIONS

EPO, Extended European Search Report for European Patent Application No. 21179289.0, dated Nov. 26, 2021, 15 pages.

(Continued)

*Primary Examiner* — Moustapha Diaby
(74) *Attorney, Agent, or Firm* — IP Spring

(57) ABSTRACT

Implementations relate to selection of a physics-specific model for determination of characteristics of radio frequency signal propagation. In some implementations, a method includes receiving a plurality of first propagation characteristics of a radio frequency (RF) signal, determining a feature vector based on the first propagation characteristics, inputting the feature vector to a machine-learning meta-model, and executing the machine learning meta-model to select a particular physics-specific model from multiple physics-specific models, where each of the physics-specific models is for a different RF signal propagation environment. The feature vector is input to the particular physics-specific model, and the particular physics-specific model is executed to output an estimate of one or more second propagation characteristics of the RF signal based on the feature vector.

20 Claims, 5 Drawing Sheets

(51) Int. Cl.
*H04B 17/391* (2015.01)
*G06N 20/00* (2019.01)
*H04W 24/06* (2009.01)
*G06F 18/214* (2023.01)

(56) References Cited

U.S. PATENT DOCUMENTS

2019/0244139 A1* 8/2019 Varadarajan ............ G06N 20/10
2019/0362237 A1* 11/2019 Choi ........................ G06N 3/084
2020/0320428 A1* 10/2020 Chaloulos .............. G06N 20/00

OTHER PUBLICATIONS

Cavalcanti, et al., "A Hybrid Path Loss Prediction Model based on Artificial Neural Networks using Empirical Models for LTE and LTE-A at 800 MHz and 2600 MHz", Journal of Microwaves, Optoelectronics and Electromagnetic Applications, vol. 16, No. 3, Sep. 2017, 15 pages.
Hou, et al., "A new method for radio wave propagation prediction based on finite integral method and machine learning", 2017 IEEE 5th International Symposium on Electromagnetic Compatibility (EMC—Beijing), Jan. 18, 2018, 4 pages.
Imai, et al., "Radio Propagation Prediction Model Using Convolutional Neural Networks by Deep Learning", 2019 13th European Conference on Antennas and Propagation (EuCAP), Jun. 20, 2019, 5 pages.
Kuno, et al., "Prediction method by deep-learning for path loss characteristics in an open-square environment", International Symposium on Antennas and Propagation (ISAP), 2018, pp. 443-444.

* cited by examiner

SELECTION OF PHYSICS-SPECIFIC MODEL FOR DETERMINATION OF CHARACTERISTICS OF RADIO FREQUENCY SIGNAL PROPAGATION

CROSS-REFERENCE TO RELATED APPLICATIONS

This application claims priority to European Patent Application No. 21179289.0, entitled "SELECTION OF PHYSICS-SPECIFIC MODEL FOR DETERMINATION OF CHARACTERISTICS OF RADIO FREQUENCY SIGNAL PROPAGATION," filed Jun. 14, 2021, which is incorporated by reference herein in its entirety.

BACKGROUND

The popularity of portable devices has allowed wireless radio frequency (RF) signal transmission to become ubiquitous, enabling a device to send and receive information to and from other devices wirelessly. Many devices include the capability to communicate wireless signals via cellphone data and voice protocols, Wi-Fi® protocols, Citizens Band services, and others. However, wireless signal transmission may be subject to interference from a variety of sources, including devices, users, environment, weather, terrain, structures and objects in proximity to transmitted signals, etc. Determination of factors leading to interference with wireless signal propagation between devices has been made and used to predict the strength and range of wireless signals at various locations, e.g., when allocating bandwidth of radio frequency spectrum for the use by various signals and devices. However, the factors that cause interference and influence signal propagation can vary significantly in various contexts, such that these predictions have been approximate and often inaccurate, and may require extensive manual input and evaluation to obtain acceptable results.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to selection of physics-specific models for determination of environmental-specific characteristics of radio frequency signal propagation. In some implementations, a computer-implemented method includes receiving a plurality of first propagation characteristics of a radio frequency (RF) signal, determining a feature vector based on the plurality of first propagation characteristics, inputting the feature vector to a machine-learning meta-model, and executing the machine-learning meta-model to select a particular physics-specific model from a plurality of physics-specific models, where each of the physics-specific models is for a different RF signal propagation environment. The feature vector is input to the particular physics-specific model, and the particular physics-specific model is executed to output an estimate of one or more second propagation characteristics of the RF signal based on the feature vector.

Various implementations and examples of the method are described. For example, in some implementations, the first propagation characteristics include a geographic location of a transmitter that transmitted the RF signal, a geographic location of a receiver that received the RF signal, and/or a distance between the transmitter and the receiver. In some implementations, the first propagation characteristics include RF environmental characteristics such as descriptions of geographical features that are located within a threshold distance of the transmitter and receiver locations, located between the transmitter and receiver locations, and/or located along paths of the RF signal. In some implementations, the geographical features include geographical locations, heights, dimensions, shapes, and/or contours of the geographical features. In some implementations, the geographical features include landscape features including one or more of foliage, hills, mountains, or canyons; or structure features including one or more buildings or bridges.

In some implementations, at least one physics-specific model is trained as a machine-learning model, and the method includes training the at least one physics-specific model prior to receiving the first propagation characteristics of the RF signal. In some implementations, each of the physics-specific models is trained using a training feature vector that has the same dimensions of the feature vector, where the training feature vector indicates signal strength or signal attenuation of training RF signals. In some implementations, at least one of the physics-specific models is an algorithmic model.

In some implementations, the method further includes pruning the feature vector to remove one or more elements having reduced applicability to the particular physics-specific model. In some implementations, the different RF signal propagation environments include a dense clutter loss environment; a direct path through absorptive materials, and/or a path environment dominated by tropospheric scatter. In some implementations, the one or more second propagation characteristics include path loss for the RF signal in a particular RF signal propagation environment through which the RF signal is to propagate. In some implementations, the method further includes setting one or more parameters for RF communication based on the one or more second propagation characteristics, where the RF communication is to communicate the RF signal between a transmitter and a receiver.

In some implementations, the method further includes training the machine-learning meta-model prior to receiving the plurality of first propagation characteristics of the RF signal, where training the machine-learning meta-model is based, at least in part, on output from one or more of the plurality of physics-specific models.

In some implementations, a system for determining environmental-specific propagation characteristics of a radio frequency (RF) signal includes a memory storing instructions and at least one processor coupled to the memory, the at least one processor configured to access the instructions from the memory to perform operations. The operations include receiving a plurality of first propagation characteristics of the RF signal, determining a feature vector based on the plurality of first propagation characteristics, inputting the feature vector to a machine-learning meta-model, executing the machine-learning meta-model to select a particular physics-specific model from a plurality of physics-specific models, wherein each of the physics-specific models is for a different RF signal propagation environment, inputting the feature vector to the particular physics-specific model, and executing the particular physics-specific model to output an estimate of one or more second propagation characteristics of the RF signal based on the feature vector.

In various implementations of the system, the first propagation characteristics include a geographic location of a transmitter that transmitted the RF signal, a geographic location of a receiver that received the RF signal, and/or a distance between the transmitter and the receiver. In some implementations, the first propagation characteristics include RF environmental characteristics such as descriptions of geographical features that are located within a threshold distance of the transmitter and receiver locations, located between the transmitter and receiver locations, and/or located along paths of the RF signal.

In some implementations, the at least one processor further performs an operation comprising pruning the feature vector to remove one or more elements having reduced applicability to the particular physics-specific model. In some implementations, the different RF signal propagation environments include at least one of: a dense clutter loss environment; a direct path through absorptive materials, or a path environment dominated by tropospheric scatter. In some implementations, the one or more second propagation characteristics include path loss for the RF signal in a particular RF signal propagation environment through which the RF signal is to propagate. In some implementations, the at least one processor further performs operations of training the plurality of physics-specific models as machine-learning models prior to receiving the plurality of first propagation characteristics of the RF signal, and training the machine-learning meta-model prior to receiving the plurality of first propagation characteristics of the RF signal. The system and/or operations can include other features similarly as described above for the method.

In some implementations, a non-transitory computer readable medium having stored thereon software instructions that, when executed by a processor, cause the processor to perform operations. The operations include comprising receiving a plurality of first propagation characteristics of a radio frequency (RF) signal, determining a feature vector based on the plurality of first propagation characteristics, inputting the feature vector to a machine-learning meta-model, executing the machine-learning meta-model to select a particular physics-specific model from a plurality of physics-specific models, wherein each of the physics-specific models is for a different RF signal propagation environment, inputting the feature vector to the particular physics-specific model, and executing the particular physics-specific model to output an estimate of one or more second propagation characteristics of the RF signal based on the feature vector. The operations can include other features similarly as described above for the method.

DETAILED DESCRIPTION

Figure 1:
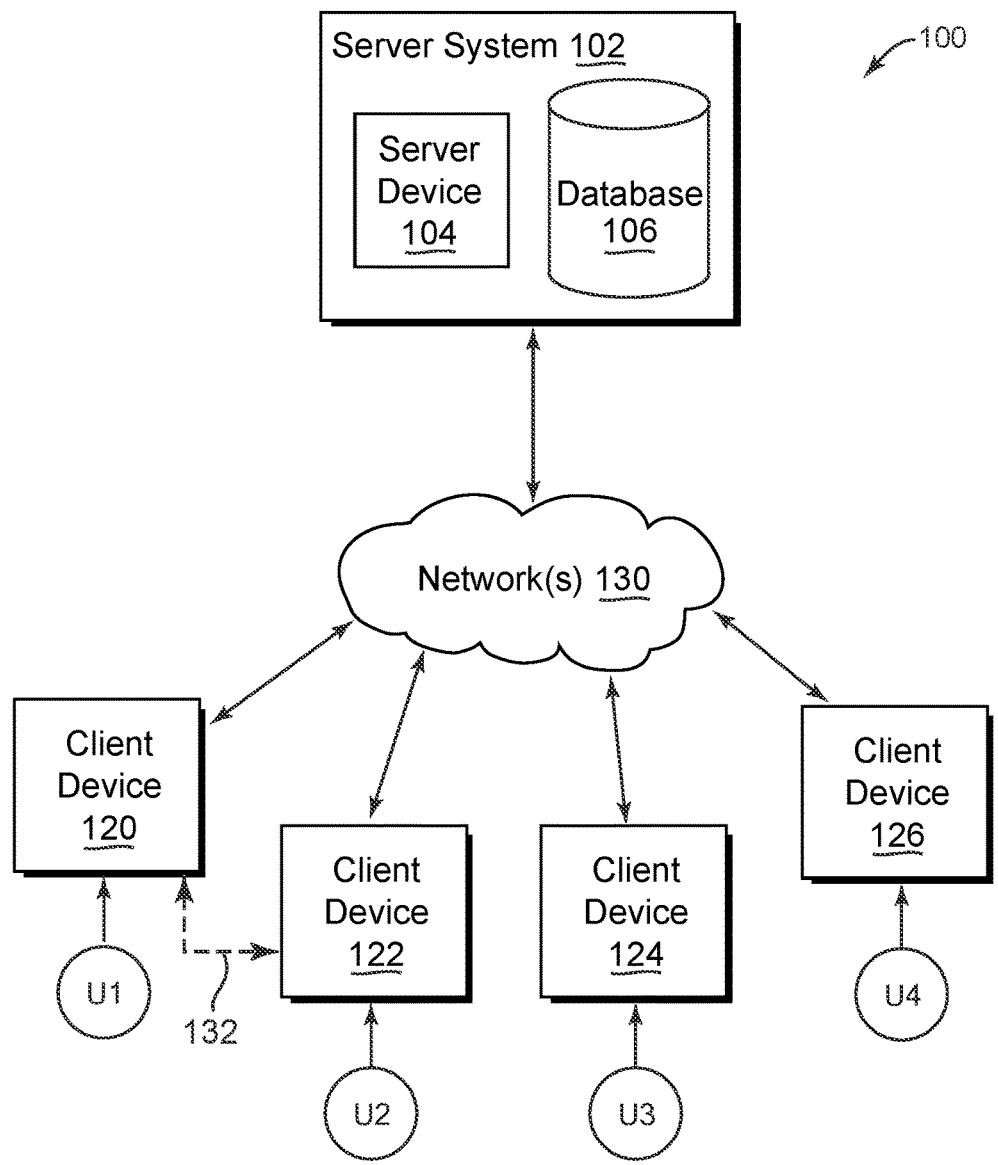
FIG. 1 is a block diagram of an example system which may be used for one or more implementations described herein.

One or more implementations described herein relate to determination of RF signal propagation characteristics. In various implementations, a method includes receiving known propagation characteristics associated with a radio frequency (RF) signal, e.g., propagation characteristics of an RF environment for propagating an RF signal, and determining a feature vector based on the propagation characteristics. The feature vector is input to a machine-learning meta-model, which is executed to select a particular physics-specific model from multiple such models. For example, the selected physics-specific model can provide the most accurate propagation estimates, of the multiple physics-specific models, for RF signals propagated in the RF environment of the RF signal. The feature vector is then input to the selected particular physics-specific model, and the particular model is executed to output an estimate of requested propagation characteristic(s) of the RF signal based on the feature vector. For example, a requested propagation characteristic can be path loss for the RF signal in the RF environment through which the RF signal is to propagate.

Various additional features are described. For example, the known propagation characteristics can include geographic locations of a transmitter that transmitted the RF signal and a receiver that received the RF signal, and/or a distance between the transmitter and the receiver. The known propagation characteristics can include RF environmental characteristics including descriptions of geographical features that are located within a threshold distance of the transmitter and receiver locations, located between the transmitter and receiver locations, and/or located along paths of the RF signal. The geographical features can include geographical locations, heights, dimensions, shapes, and/or contours of the geographical features. In some implementations, the geographical features can include landscape features including one or more of foliage, hills, mountains, or canyons, and/or structure features including one or more buildings or bridges.

In some implementations, the feature vector is pruned to remove elements having reduced applicability to the particular physics-specific model that was selected by the meta-model. The multiple physics-specific models can each be associated with a different RF environment for RF signals. The different RF environments can include a dense clutter loss environment, a direct path through absorptive materials, and a path environment dominated by tropospheric scatter.

One or more of the multiple physics-specific models can be trained prior to the use of the meta-model to select one of these models. For example, each of the physics-specific trained models can be trained using a training feature vector that has the same dimensions as the feature vector generated as described above, and each model is trained using a respective set of data that is based on a different RF propagation mechanism, e.g., each set of training data reflects a different propagation process. In some examples, different RF propagation mechanisms can exist in different RF environments. The training data for the models can include signal strength or signal attenuation data of training RF signals. The machine-learning meta-model can be trained prior to receiving the known propagation characteristics of the RF signal as described above, where the meta-model is trained using a training feature vector that has the same dimensions as the training feature vector described above. The meta-model can be trained by providing a training feature vector to each of the physics-specific models and determining which of the trained models provides propagation characteristic estimates with the smallest error.

The estimate of RF propagation provided by described features has several applications. For example, one or more parameters for RF communication between a device and a base station (or any other combination of RF transmitter-receiver) can be set based on the estimate provided by described features. Such parameters may include, e.g., frequency band used for RF communication, power level for transmission, antenna parameters, beamforming characteristics, etc. The estimate propagation characteristics, being specific for the particular RF environment, will more likely result in efficient RF communication through such parameter selection (e.g., with greater nuance) as opposed to non-specific or less-sophisticated parameter selection (e.g., based only on RSSI; based only on determination of whether a device is indoors/outdoors; or other such techniques). The use of provided estimated characteristics can have technical benefits of improved RF communication (greater throughput, lower power usage, more reliable connection, etc.).

In some examples, the use of RF propagation modeling is central to many wireless services projects. A service can provide analysis of network performance based on an RF propagation model, and its competitiveness can be directly related to the quality of the RF propagation model used. Allocated use of various radio services such as Citizens Broadband (CBRS), 5G cell phone service, etc., as well as spectrum sharing and other techniques, are based in large part on RF propagation modeling.

There are several other advantages to described techniques and features. Described implementations provide an integrated model of RF propagation that encompasses a number of discrete and unique RF propagation conditions and environments, does not have the disadvantages of a model that merges all of these unique environments into a single model, and requires no manual intervention to select the model that is specific to any given RF propagation condition. The RF model design incorporates a meta-model that is a meta-layer, e.g., it is not an RF propagation model itself, but is instead a "model of models," that has been trained to select the appropriate model from a set of specialized models that can be trained on the same or other training data. The integrated model is constructed by training the specialized, lower level, environment or phenomenology models first, and then training the meta-model (e.g., selection layer) to select the most appropriate model among them.

The described features can enable faster and more accurate determination and estimation of RF signal propagation between devices. Described implementations use cascaded models, e.g., where the outputs of one set of physics-specific models is used to train the meta-model, and/or where the output of the meta-model determines use of a specialized model that uses a partitioned data set to obtain a result. Techniques described herein improve the selection of an appropriate model that is suited to estimate signal characteristics for a particular RF signal environment, leading to more accurate results. Some implementations can employ a reduced feature vector that reduces the amount of computations and processing of the machine learning models used for propagation evaluation.

For example, no human interaction is required to select the appropriate model for any specific case. The model has the benefits of physics specific training and a full range of applicability, without manual selection of model type.

In addition, described processes are relatively insensitive to errors in initial classification of propagation phenomenology. Even if initial training data includes misallocated training elements, the resulting meta-model appropriately deploys the correct model for each prediction. Because the meta-model is trained to select the model with the closest estimate, it will not replicate any errors in training data classification. Cross-mixing of a sample of each phenomenology training set across the other training sets ensures that the impact of mis-classification is minimized, and that the results are not unreasonable.

Furthermore, each of the models can be more accurate, as it only is primarily trained on a focused, less divergent range of homogeneous physical propagation conditions. By factoring in two layers of decision making in some implementations, described techniques obtain a more compact and less resource consuming model. For example, while the feature vector for the meta-model may be extensive, it is not necessary that the meta-model be very deep. Correspondingly, each of the specialized models can use reduced feature vectors, but provide greater model depth to determine accurate predictions. Since the model complexity (weights in a dense network) is on the order of the square of the feature vector dimensions, this results in a much less expensive model that is highly accurate.

Consequently, a technical effect of one or more described implementations is that devices expend fewer computational resources to obtain results. For example, a technical effect of described techniques is a reduction in the consumption of system processing resources as compared to prior systems that do not provide one or more of the described techniques or features. For example, such a prior system may require testing of many radio propagation models to find an accurate estimate of RF propagation behavior, which expends system resources. Features described herein can reduce such disadvantages by, e.g., enabling selection of an appropriate trained machine learning model for a particular RF environment that provides an accurate estimate of RF signal propagation in that environment with lower overall processing requirements.

Further to the descriptions herein, a user may be provided with controls allowing the user to make an election as to both if and when systems, programs, or features described herein may enable collection of user information (e.g., information about a user's social network, social actions, or activities, profession, a user's preferences, a user's current location, or a user's device transmission and reception of radio signals), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server devices, e.g., server system 102 in the example of FIG. 1. Server system 102 can communicate over a network 130, for example. Server system 102 can include a server device 104 and a database 106 or other storage device. Network environment 100 also includes one or more client devices, e.g., client devices 120, 122, 124, and 126, which may communicate with server 102, with each other, and/or with other devices via network connections 130. Network 130 can be any type of communication network, including one or more of the Internet, local area networks (LAN), wireless networks, switch or hub connections, etc. In some implementations, network 130 can include peer-to-peer communication between devices 120-126, e.g., using peer-to-peer wireless protocols (e.g., Bluetooth®, Wi-Fi Direct, etc.) or having one client device act as a server to the other client device, etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, client devices 120-126 may interact with server system 102 via applications running on respective client devices and/or server system 102. For example, respective client devices 120, 122, 124, and 126 may communicate data to and from server system 102. In some implementations, server system 102 may send various data to all or particular devices of the client devices, such as content data (e.g., audio, images, video, messages, emails, etc.), notifications, commands, etc. Each client device can send appropriate data to the server system 102, e.g., acknowledgments, requests for data, notifications, user commands, etc. In some examples, the server and client devices can communicate various forms of data, including text data, audio data, video data, image data, or other types of data.

Server system 102 and client devices 120-126 can be any types of devices used in a variety of applications. In some examples, server system 102 wirelessly communicates with client devices over network connections 130, the client devices providing various features that can be enabled or supplemented by signals from the server mobile device. There may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), earpiece, earbuds, fitness band, wristwatch, headset, armband, jewelry, etc.), virtual reality (VR) and/or augmented reality (AR) enabled devices, personal digital assistant (PDA), media player, game device, etc. Some client devices may also have a local database or other storage.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Various applications and/or operating systems executing on the server and client devices can enable a variety of functions including display of content data, privacy settings, notifications, browsers, email applications, communication applications, etc. A user interface can be displayed on a client device using an application or other software executing on the client device, software on the server device, and/or a combination of client software and server software executing on server 102, e.g., application software or client software in communication with server 102. The user interface can be displayed by a display device of a client device or server device, e.g., display screen(s), projector, etc. In some implementations, application programs running on a server can communicate with a client device to receive user input at the client device and to output data such as visual data, audio data, etc. at the client device.

Machine learning models can be used by server system 102 and/or one or more client devices 120-126 as described herein. In some implementations, the machine learning models may be neural networks with one or more nodes, arranged according to a network architecture, e.g., in one or more layers, with various nodes connected via the network architecture, and with associated weights. For example, in a training stage of the model, a model can be trained using training data as described with reference to FIGS. 2 and 3, and then at an inference stage, the trained model can determine particular propagation characteristics for a target RF signal based on its RF environment as described with reference to FIG. 4. In some implementations, a model may be trained offline, e.g., on a test device in a test lab or other setting, and the trained models may be provided to the server that executes the model, e.g., as in FIG. 3 or 4. In some implementations, the trained model may be retrained or updated locally on-device, or an untrained model may be trained on-device. In some implementations, with user permission, federated learning may be utilized to update one or more trained models, e.g., where individual server devices may each perform local model training, and the updates to the models may be aggregated to update one or more central versions of the model.

Figure 2:
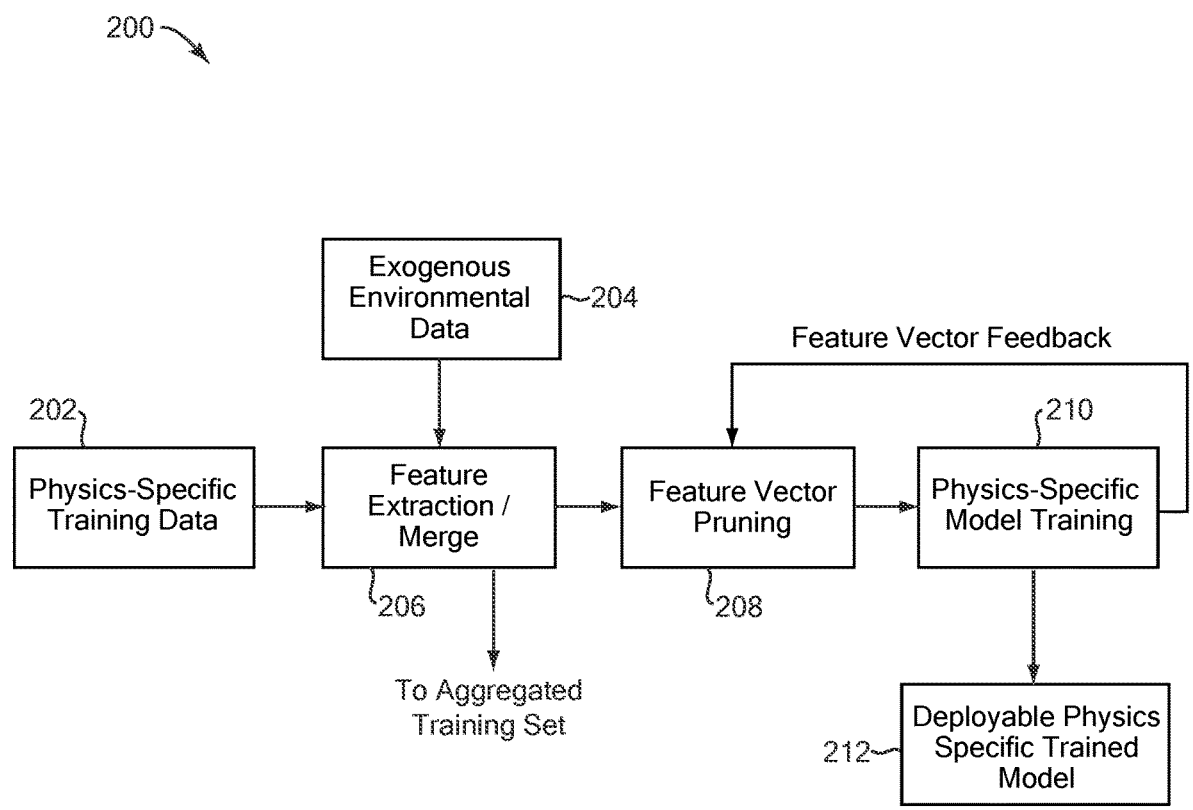
FIG. 2 is a block diagram illustrating an example method to generate a deployable physics-specific trained machine-learning model for RF signal propagation, according to some implementations.

FIG. 2 is a block diagram illustrating an example method 200 to generate a deployable physics-specific trained machine-learning model for RF signal propagation, according to some implementations. In some implementations, method 200 can be implemented on a server, e.g., server system 102 as shown in FIG. 1. In some implementations, some or all of the blocks of method can be implemented on one or more client devices (e.g., client devices 120, 122, 124, or 126 as shown in FIG. 1), one or more server devices, and/or on both server device(s) and client device(s). In described examples, the system(s) implementing the blocks of method 200 include one or more processors or processing circuitry ("processors"), and can access one or more storage devices such as database 106 or other accessible storage. In some implementations, different components of one or more server systems can perform different blocks or portions of blocks.

FIG. 2 illustrates the generation and training of a specialized model for a particular propagation environment, e.g., an environment-specific model or "physics-specific model." In some implementations, the method and blocks shown in FIG. 2 are implemented multiple times, with each such implementation generating a respective physics-specific model for a different environment of a set of multiple RF environments. In this way, a set of multiple physics-specific models can be trained. In each of the RF environments of the set, a particular propagation mechanism dominates and is different from other environments in which other propagation mechanism(s) dominate. Some examples of different RF environments can include a dense clutter loss environment, a direct path through absorptive materials, a path environment dominated by tropospheric scatter, etc.

To train a particular physics-specific model, physics-specific training data 202 and exogenous environmental data 204 are provided as a set of training data that is representative of a particular environment of the set of multiple RF environments where a particular propagation mechanism dominates.

Physics-specific training data 202 includes propagation data indicating characteristics of RF signals propagated between devices, where at least one of the devices is located in the particular RF environment. In some implementations, the training data is obtained from test transmissions of RF signals. In some implementations, the training data can be sample data, e.g., generated data from operational transmissions. In some implementations, the propagation training data can be obtained, if user permission has been received, from actual RF signals transmitted from and/or received by devices of multiple users and/or other devices, where these devices have transmitted and/or received signals in the particular RF environment. In some examples, a device can measure one or more characteristics of RF signals received at the device. For example, the training data 202 can include measured RF propagation data, e.g., path loss or path attenuation data. Such data can include signal strengths of RF signals and/or reduction in power density of signal strength over time. In some implementations, the radio propagation data can include received signal strength indicators (RSSIs) that indicate a power level or signal to noise ratio of RF signals received at the device in particular geographical locations of the particular RF environment. In some implementations, the radio propagation data can include link quality indicators (LQIs) that indicate data throughput rate of signals received at the client devices for the particular RF environment. Data 202 also includes necessary information such that the appropriate information from the exogenous sources in data 204 can be identified and retrieved, including data such as locations, altitudes, times, etc.

Exogenous environmental data 204 can include physical and geographic characteristics of the particular RF environment, e.g., RF environment characteristics. In some implementations, data 204 can indicate or reflect the geographical locations of the transmitter and receiver that sent and received each RF signal described in the propagation data 202. In some implementations, environmental data 204 can indicate the height above the ground of the antennas used in the RF signal transmission and/or reception, and/or the size, shape, or dimensions of the antenna(s). In some examples, data 204 can include geographical data including descriptions of geographical features, e.g., landscape features (foliage, hills, mountains, canyons, etc.) and/or structure features (buildings, bridges, etc.). These geographical features can be located at the locations of the transmitter and the receiver (e.g., within a threshold distance of the transmitter and receiver locations), located between the transmitter and receiver locations, and/or located along paths of the RF signals. Additionally, data 204 may include a wider range of information that can be indicative of likely propagation modes, such as reflective, attentive, and other features. In further examples, the geographical data can indicate characteristics of the geographical features including geographical locations and heights (e.g., altitudes, height profiles, etc.) of the geographical features, as well as dimensions, shapes, and/or contours of the geographical features.

Environmental data 204 can include, in some implementations, radio signal absorbtivities, reflectivities, and/or transmissivities of geographic features at those locations, e.g., geographic features located at or between the transmitter and receiver as described above. In some implementations, environmental data 204 can include characteristics of the propagation medium (such as air), including humidity, moisture, weather, and/or atmospheric conditions at the locations of the RF signal propagation. For example, for a propagation medium of air, the most common characteristics occurring in the propagation area can be used, or particular characteristics at specified times of day, year, etc. (e.g., if building a physics-specific model for a particular time period, such as a particular month or particular multiple months of a year, etc.). In further examples, data 204 can include terrain data, vegetation coverage data, soil and moisture data, ionospheric conditions, weather, and societal data such as holidays and other events that may impact the RF environment. In some implementations, at least some of data 204 can be obtained from data sources such as public map data sources, weather and atmospheric data sources, etc.

In some implementations, particular exogenous environmental data 204 can be associated with particular propagation data of the physics-specific training data 202. For example, propagation data 202 indicating signal strengths of signals can be associated with particular geographical features of the environmental data 204 that provide the environment for those signals, such as location and characteristics of that location (altitude, position of features such as buildings, foliage, etc. relative to the signal path, etc.).

Physics-specific training data 202 and exogenous environmental data 204 are both input to a feature extraction and merge block 206. Feature extraction and merge block 206 generates a feature vector against which the physics-specific model can be trained. Block 206 determines particular radio propagation characteristics from data 202 and 204 and generates a feature vector that includes those characteristics as elements. For example, the feature vector can be a condensed numerical representation of the propagation characteristics and associated environmental characteristics obtained in data 202 and 204. In some implementations, the feature vector can be a vector having a particular number of dimensions, with a value for each dimension. In some implementations, the feature vector can be generated by a neural network based on the propagation characteristic values (e.g., signal strength or attenuation, location coordinate, altitude, heights of landscape and structure features, etc.).

The feature vector includes the elements that may be used by all of the RF environments of the set of RF environments for which physics-specific models are being trained, so that a common feature vector is used to train all of the physics-specific models. For a particular physics-specific model, only a subset of the elements of the feature vector may be relevant; e.g., some elements in the feature vector may not be applicable to any given RF environment. In some implementations, block 206 can generate the feature vector based on physics-specific training data 202 and exogenous environmental data 204 that are obtained for all of the environments in the set of RF environments, such that all of the elements of the common feature vector can be determined. In some implementations, the generated feature vector is provided to a feature vector pruning block 208. Some implementations can provide the generated feature vector directly to physics-specific model training block 210.

In some implementations, the generated feature vector is also provided to an aggregated training set used to train a meta-model, as described below with respect to FIG. 3.

Feature vector pruning block 208 can be provided, in some implementations, to prune the feature vector generated by block 206 to a more simplified form. For example, some elements of the feature vector may not be applicable, or at least significant, to all of the physics-specific models, and may introduce reduced or minimal utility, but complexity and additional depth and dimensionality to the learning network. Elements of the feature vector that connect to the early layers of the learning network that have zero or low weighting may be considered for elimination in the network, in order to simplify the model in the implementation. For example, if the physics-specific model is for a path environment that is dominated by tropospheric scatter, and if elements of the feature vector are associated with a different RF environment that provides a direct path through absorptive materials, it can be determined in block 208 that those elements can be eliminated or reduced in number.

The pruning provided by block 208 can enable each of the physics-specific models to be simplified and be much less complex than if all the elements of the feature vector are retained. In some implementations, the pruning can be performed using machine learning regularization, and/or via explicit manual examination of the parameters developed during training.

Physics-specific model training block 210 can perform the training of the physics-specific model after the feature vector generation of block 206 and any feature vector pruning of block 208. Model training block 210 trains the particular physics-specific model using the training data of data 202 and data 204 that is primarily from the specific RF environment to which that data primarily pertains.

In some implementations, to avoid the use of outlier data in training the physics-specific model, a subsample of each environment training set (e.g., each set of physics-specific training data 202 and exogenous environmental data 204 for the set of multiple RF environments) can be used in the training of the physics-specific model in block 210 in order to avoid outlier results in the possible case of mis-selection of the appropriate physics-specific model.

In some implementations, output from the model training block 210 can be provided as feedback to the feature vector pruning block 208. This output can indicate particular elements of the feature vector that are not applicable or significant to the particular RF environment of the physics-specific model being trained, and these elements can be pruned from the feature vector in block 208 where they do not provide meaningful marginal value. Training block 210 can determine these particular, less significant elements during the training process, in which particular elements of the training data 202 and 204 are determined to be the more significant members of the training feature vector for each of the physics-specific models using any of a variety of techniques, e.g., weight analysis, permutation selection, manual intervention and experimentation, etc.

A physics-specific trained model 212 results from the training of block 210. Model 212 is deployable as a specialized model that is one of multiple specialized models for the meta-model training as described below with respect to FIG. 3.

As described above, a respective physics-specific trained model 212 can be determined for each (or each of a subset) of the RF environments in the set of different RF environments. This produces a set of multiple physics-specific trained models 212.

Figure 3:
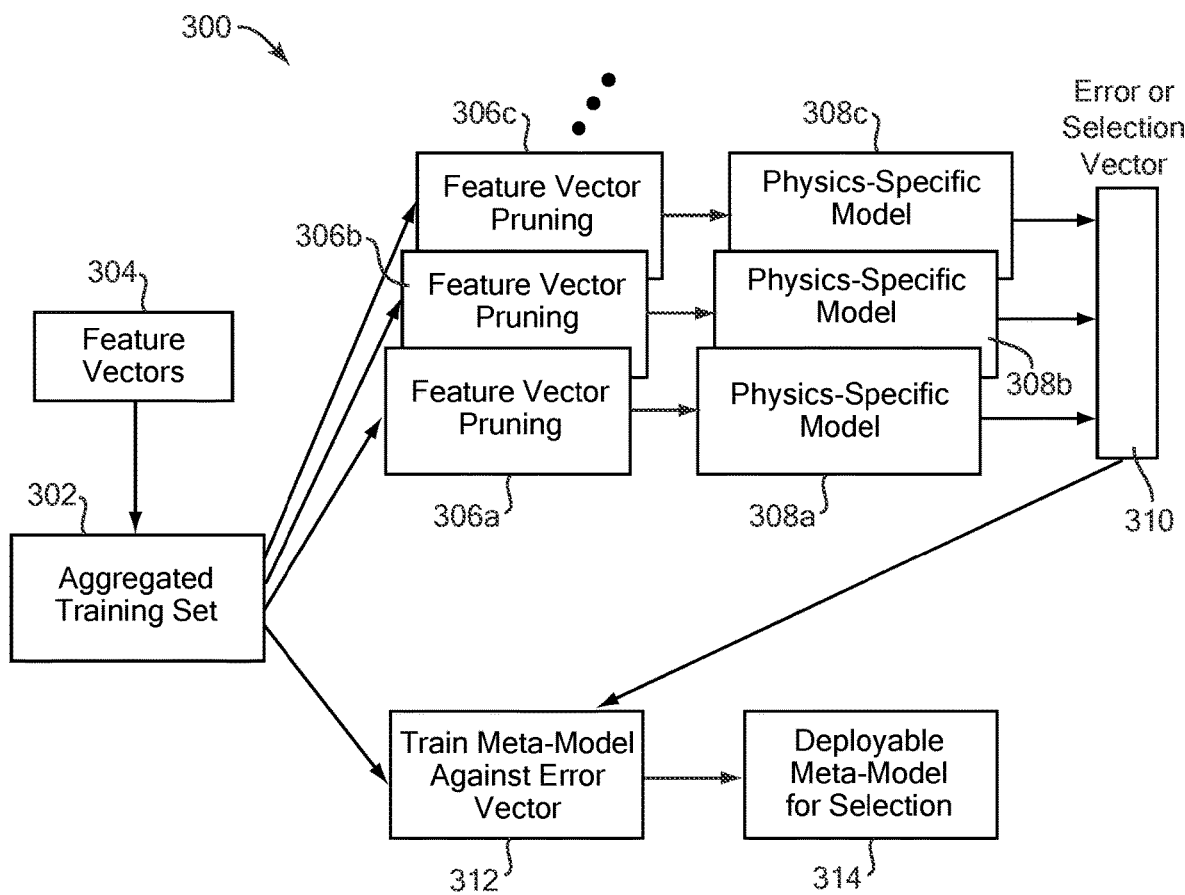
FIG. 3 is a block diagram illustrating an example method to generate a machine-learning meta-model that selects a specialized model for a particular RF propagation environment, according to some implementations, according to some implementations.

FIG. 3 is a block diagram illustrating an example method 300 to generate a machine-learning meta-model that selects a specialized physics-specific model for a particular RF propagation environment, according to some implementations. In some implementations, method 300 can be implemented on a server, e.g., server system 102 as shown in FIG. 1. In some implementations, some or all of the blocks of method 300 can be implemented on one or more client devices (e.g., client devices 120, 122, 124, or 126 as shown in FIG. 1), one or more server devices, and/or on both server device(s) and client device(s). In described examples, the system(s) implementing the blocks of method 300 include one or more processors or processing circuitry ("processors"), and can access one or more storage devices such as database 106 or other accessible storage. In some implementations, different components of one or more server systems can perform different blocks or portions of blocks.

FIG. 3 illustrates the generation of a meta-model that is trained to select an RF environment-specific model, such as one of the specialized physics-specific models generated as described above with respect to FIG. 2 or other physics-specific model. The meta-model is a meta-layer, e.g., it is not an RF propagation model itself, but is instead a "model of models," that can be trained to select the appropriate model from a set of specialized models that, for example, can be trained on the same or other training data. A cascaded model structure can be used for the training of the meta-model, in which the outputs of one set of physics-specific models is used to train the meta-model. The meta-model is trained to determine which RF environment-specific model, of all the environment-specific models for which the meta-model is trained to select from, provides the most accurate prediction of RF signal propagation in a particular RF environment. For example, the meta-model can be trained to determine the most accurate physics-specific model for a given feature vector. In some implementations, the physics-specific models from which the meta-model can select are trained; for example, some or all of these models can be trained as described with respect to FIG. 2. In some implementations, one or more of these selectable physics-specific models are not trained via machine-learning techniques and may have been generated using other techniques. For example, a physics-specific model can be an algorithmic model, e.g., determined from prior regression analysis or other techniques.

In block 302, an aggregated training set is determined. For example, the aggregated training set (e.g., composite training set) can be based on merging all of the training data (or a random subset of the training data) into the aggregated training set. In some examples, the aggregated training set can include the feature vectors 304 that include the training data used in training the physics-specific models as described with respect to FIG. 2. For example, feature vectors 304 can include all of the feature vectors generated in feature extraction and merge block 206 in the respective processes of training the respective physics-specific models. As described above, the initial feature vectors of all the physics-specific models have been formatted to have the same number and types of elements for training purposes. In some implementations, the feature vector used by the meta-model, as described below, may include the union of the feature vectors of the individual physics-specific models shown in FIG. 2.

The training data of the aggregated training set is provided to the deployable physics-specific models 308a, 308b, 308c, etc. (collectively referred to as 308) to obtain an evaluated result (inference) from the models 308. One or more of physics-specific models 308 are the deployable physics-specific trained models 212 determined as described for FIG. 2. In various example implementations, all of the models 308 are trained models 212, or a subset of the models 308 are trained models 212 and other models 308 are other models (e.g., algorithmic models). In some implementations, feature vector pruning blocks 306a, 306b, 306c, etc. (collectively referred to as 306) are provided to reduce the complexity of the feature vectors input to their respective associated physics-specific models 308a, 308b, 308c, etc. For example, each feature vector of the aggregated training set 302 is processed through each feature vector pruning block 306 and physics-specific model 308. In some examples, a particular feature vector is provided to feature vector pruning block 306a, which prunes the feature vector appropriately for the particular RF environment of the associated physics-specific model 308a. That feature vector is also provided to pruning blocks 306b and 306c which prune the feature vector appropriately for the RF environments of their associated physics-specific model 308b and 306c, respectively. In some implementations, pruning block 306 is not used and the feature vector is provided directly from aggregated training set 302 to each physics-specific model 308.

Each physics-specific model 308 processes a given feature vector based on the RF environment characteristics for which it was trained (or otherwise generated). The output of each physics-specific model 308 is used to determine a respective error or selection vector 310 for each feature vector. The error or selection vectors 310 can be determined from the errors in the propagation estimates from the physics-specific models 308.

For example, a given feature vector of the aggregated training set 302 is processed through each of the physics-specific models, and an error is determined in the RF propagation estimate of each of the physics-specific models for that feature vector. The error is determined based on comparing the output propagation estimate of each physics-specific model with the actual propagation values (e.g., truth values) originally collected and included in data 202.

In some implementations, each error or selection vector 310 can include a label that indicates the most accurate physics-specific model that can be determined for each feature vector (e.g., each training data item) from the set of physics-specific models 308. The label is based on the determined error in each estimate from the respective physics-specific models for a given feature vector. For example, the label indicates the physics-specific model that produced the smallest error in its estimate, which can be considered the most accurate model for the given feature vector, e.g., the "optimal" model of the set of physics-specific models for this feature vector. The label can indicate to select this optimal model when this feature vector is input.

In some implementations, the error or selection vectors 310 can include information allowing a more complex technique of error estimation. For example, the additional error in the propagation estimate can be determined relative to the error of the optimal model, that is determined by each of the non-optimal physics-specific models. For example, if physics-specific model 308a provides an estimate that has a first amount of error and that model is determined to be the optimal model for a particular feature vector, and model 308b provides an estimate that has a second amount of error, the difference between the first and second amounts of error can be determined. A similar difference in error can be determined between the estimates of models 308a and 308c. In some implementations, the error can be represented as a loss function, e.g., with a weighting reflecting linear or non-linear impact of the estimation error between truth values from data 202 and the estimates.

In block 312, a meta-model is trained using the aggregated training set from block 302 that includes the feature vector, and the error values generated from applying the feature vector to each of the individual physics-specific models. Thus, the meta-model can be trained based on the output of the physics-specific models. In some implementations, the meta-model feature vector may include the union of the feature vectors of the individual physics-specific models shown in FIG. 2.

For example, in some implementations, if a label to the optimal model is provided in the error or selection vector 310, the training of the meta-model can be performed by minimizing the number of incorrect physics-specific model selections. For example, the label indicates the correct physics-specific model to select for each feature vector.

In some implementations, if the additional error by the non-optimal models is provided in the error or selection vector 310 (e.g., a loss function) as described above, the training of the meta-model can be performed by minimizing the additional error introduced by the selection, e.g., minimizing the loss function. This allows some non-optimal models to be used if their estimation error is small. This training provides weighting to those networks that select models that avoid any significant additional estimation error through incorrect selection. This training has an advantage of not penalizing errors in selection that have little significance in the quality of the estimate.

A deployable meta-model 314 is produced by the training of block 312, that will select an accurate physics-specific model for a particular RF signal and its propagation environment.

An advantage of the meta-model (e.g., hybrid model) is that it need not be complex, since its role is to make a correct decision on the allocation of a given feature vector to one of the physics-specific models. Although it may have an extensive feature vector, it need not have extensive depth, as its accuracy is not a criteria, beyond being sufficient to differentiate when there are fundamental differences in the performance of the physics-specific models for a given case.

Figure 4:
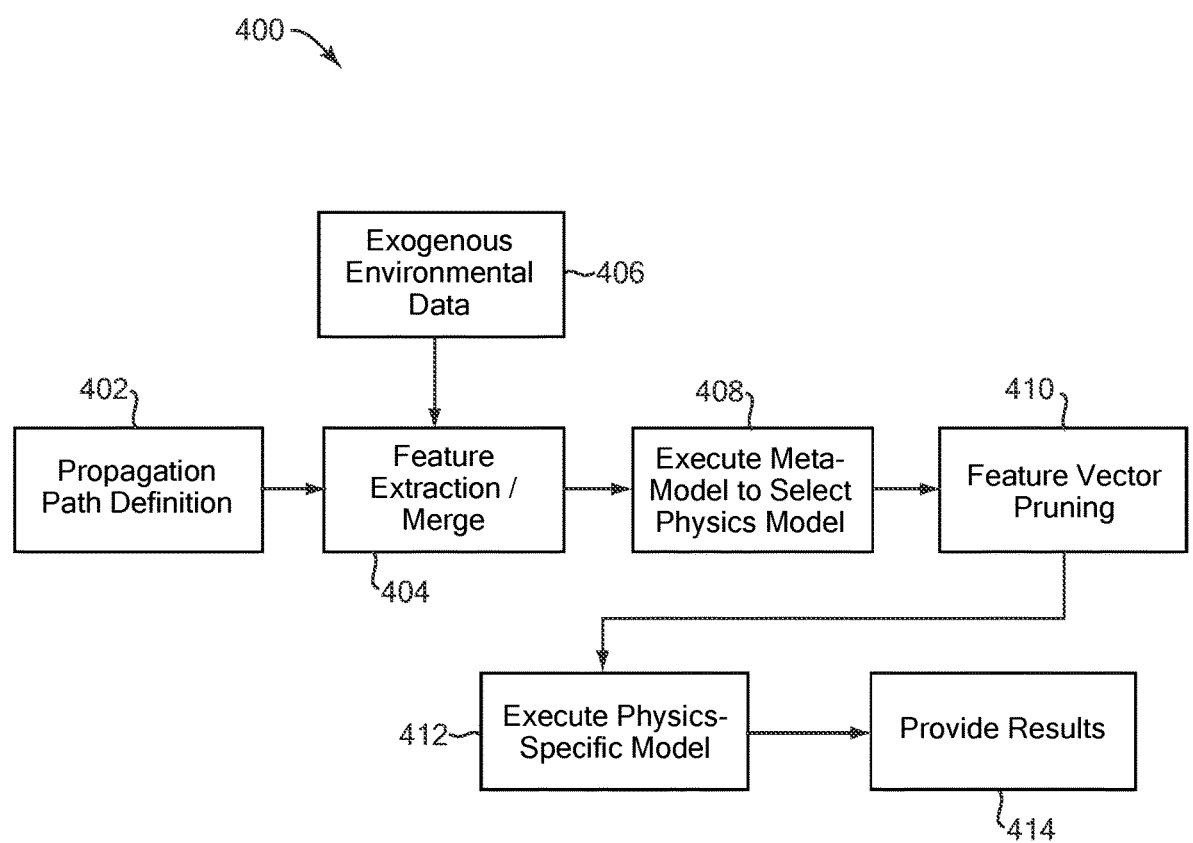
FIG. 4 is a block diagram illustrating an example method to generate an estimate of particular characteristics of RF signal propagation in an RF environment based on trained machine-learning models, according to some implementations.

FIG. 4 is a block diagram illustrating an example method 400 to generate an estimate of particular characteristics of RF signal propagation in an RF environment based on trained machine-learning models, according to some implementations. Method 400 can be used in an inference stage that uses multiple previously-trained machine learning models to determine propagation characteristics of a defined RF signal. A cascaded model structure can be used, in which the output of the meta-model determines use of a particular physics-specific model to obtain a result.

In some implementations, method 400 can be implemented on a server, e.g., server system 102 as shown in FIG. 1. In some implementations, some or all of the blocks of method 400 can be implemented on one or more client devices (e.g., client devices 120, 122, 124, or 126 as shown in FIG. 1), one or more server devices, and/or on both server device(s) and client device(s). In described examples, the system(s) implementing the blocks of method 400 include one or more processors or processing circuitry ("processors"), and can access one or more storage devices such as database 106 or other accessible storage. In some implementations, different components of one or more server systems can perform different blocks or portions of blocks.

Some implementations can initiate method 400 based on user input. A user may, for example, have selected the initiation of the method 400 from a displayed user interface. In some implementations, the method 400, or portions of the method, can be initiated automatically by a device. For example, the method (or portions thereof) can be periodically performed or performed based on the occurrence of one or more particular events or conditions.

In block 402, an RF signal propagation path definition is provided for a target RF signal. The propagation path definition indicates a propagation path that the target RF signal is desired to take, for which path loss and/or other propagation characteristics are desired to be estimated by the process 400. The propagation path of a signal can be defined by a number of characteristics of the target RF signal. These characteristics can include one or more of: the geographic locations of the transmitter that transmitted the target signal, the geographic location of the receiver that received the target signal, the distance between transmitter and receiver, direction of signal transmission, the height above the ground of the antennas used in the RF signal transmission and/or reception, and performance the antenna(s) (e.g., signal strength of the target RF signal at the point and time of signal transmission, rate of data transmission, etc.).

In feature extraction and merge block 404, a feature vector is generated based on the propagation path definition of block 402. Block 404 generates the feature vector in the same format and dimensions as described above for which the physics-specific models have been trained.

To generate the feature vector, block 404 can receive environmental characteristics, e.g., exogenous environmental data 406, that are relevant to the environment of the target RF signal. For example, the environmental data can be obtained from an exogenous environmental data source as described above for FIG. 2. The environmental characteristics can include, for example, physical and geographic characteristics of the particular RF environment that can be similar to the exogenous environmental data 204 described with respect to FIG. 2. For example, the RF environment characteristics can include geographic landscape feature and structure feature characteristics of geographical features that are located at the locations of the transmitter and the receiver (e.g., within a threshold distance of the transmitter and receiver locations), located between the transmitter and receiver locations, and/or located along paths of the RF signals. For example, the RF environment characteristics can include geographical locations, heights, dimensions, shapes, and/or contours of the geographical features, vegetation and structure presence, etc. The RF environment characteristics can include radio signal absorbtivities, reflectivities, and transmissivities of geographic features at those locations, e.g., the geographic features located at or between the transmitter and receiver as described above. In some implementations, the RF environment characteristics can include specified or generated characteristics of the propagation medium (such as air), including humidity, moisture, weather, and atmospheric conditions at the locations of the RF signal propagation. For example, for propagation medium characteristics of air, the most common characteristics for the propagation area can be used, or particular characteristics at specified times of day, year, etc. for the target signal propagation. The exogenous environmental data source can include, for example, public map data sources, weather and atmospheric data sources, etc.

For example, the feature vector can be a condensed numerical representation of the propagation path definition 402 and associated environmental characteristics obtained from data source 406. In some implementations, the feature vector can be generated by a neural network based on the propagation characteristic values.

In block 408, the meta-model is executed to select the most accurate individual physics-specific model of the multiple available specific models that the meta-model has been trained to select from. The meta-model receives the feature vector generated by the extraction and merge block 404 and, based on the feature vector and the training of the meta-model as described with reference to FIG. 3, selects the most accurate physics-specific model for the feature vector from the models it has been trained to evaluate or select from. For example, the RF environment for the target RF signal can be indicated in the feature vector, so that the particular physics-specific model is selected, from the set of physics-specific models, that provides the most accurate propagation estimates for that RF environment. As described above with respect to FIGS. 2 and 3, each physics-specific model can be associated with a particular RF environment such as a dense clutter loss environment, a direct path through absorptive materials, a path environment dominated by tropospheric scatter, etc.

In feature vector pruning block 410, in some implementations, the original feature vector from block 404 and used by block 408 can be adjusted to a more simplified form based on the physics-specific model selected by the meta-model in block 408. The original feature vector can be adjusted to remove dimensions that were determined during training to be unnecessary to the selected physics-specific model. For example, some elements of the feature vector may not be applicable or significant to the RF environment of the selected physics-specific model, and may introduce complexity and additional depth and dimensionality to the learning network. For example, if the selected physics-specific model is for a RF environment that is dominated by tropospheric scatter, then elements or dimensions of the feature vector that are not associated with that RF environment can be eliminated or reduced in number. Similarly to the training methods of FIGS. 2 and 3, the pruning can be performed using machine learning regularization, and/or via explicit manual examination of the parameters developed during training. In some implementations, feature vector pruning block 410 can be omitted.

In block 412, the selected trained physics-specific model is executed using the feature vector (original feature vector from block 404 or reduced feature vector from block 410). The selected physics-specific model processes the elements of the feature vector to determine results based on its training.

The results of execution of the selected physics-specific model 412 are provided in block 414. The results include an estimate of one or more propagation characteristics of the target RF signal in its RF environment. For example, in some implementations, these results include an estimate or prediction of the path loss of the RF signal given propagation characteristics for the RF signal including locations of the transmitter and receiver, characteristics of geographical feature in the signal path (landscape feature contours, structures, etc.), and other RF environment characteristics. For example, the path loss can reflect (e.g., be based at least partially on) effects such as propagation loss (free-space loss), absorption losses (e.g., due to structures, buildings, and/or vegetation), refraction and/or diffraction losses, tropospheric reflection, etc.

In some implementations, the resulting estimated characteristic(s) from block 414 are used in one or more additional blocks (not shown). For example, the additional blocks can set one or more parameters for RF communication based on the estimated characteristic(s), where the RF communication is to communicate the target RF signal between a transmitter and a receiver, e.g., a device and a base station, or any other combination of RF communication devices. The parameters may include, e.g., frequency band used for RF communication, power level for transmission, antenna parameters, beamforming characteristics, etc. The estimate propagation characteristics, being specific for the particular RF environment, will more likely result in efficient RF communication through such parameter selection (e.g., with greater nuance) as opposed to non-specific or less-sophisticated parameter selection (e.g., based only on RSSI; based only on determination of whether a device is indoors/outdoors; or other such techniques). The use of the estimated characteristics can have technical benefits of improved RF communication (greater throughput, lower power usage, more reliable connection, etc.).

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

One or more methods disclosed herein can operate in several environments and platforms, e.g., as a stand-alone computer program that can run on any type of computing device, as a mobile application ("app") run on a mobile computing device, etc.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations of a method can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Figure 5:
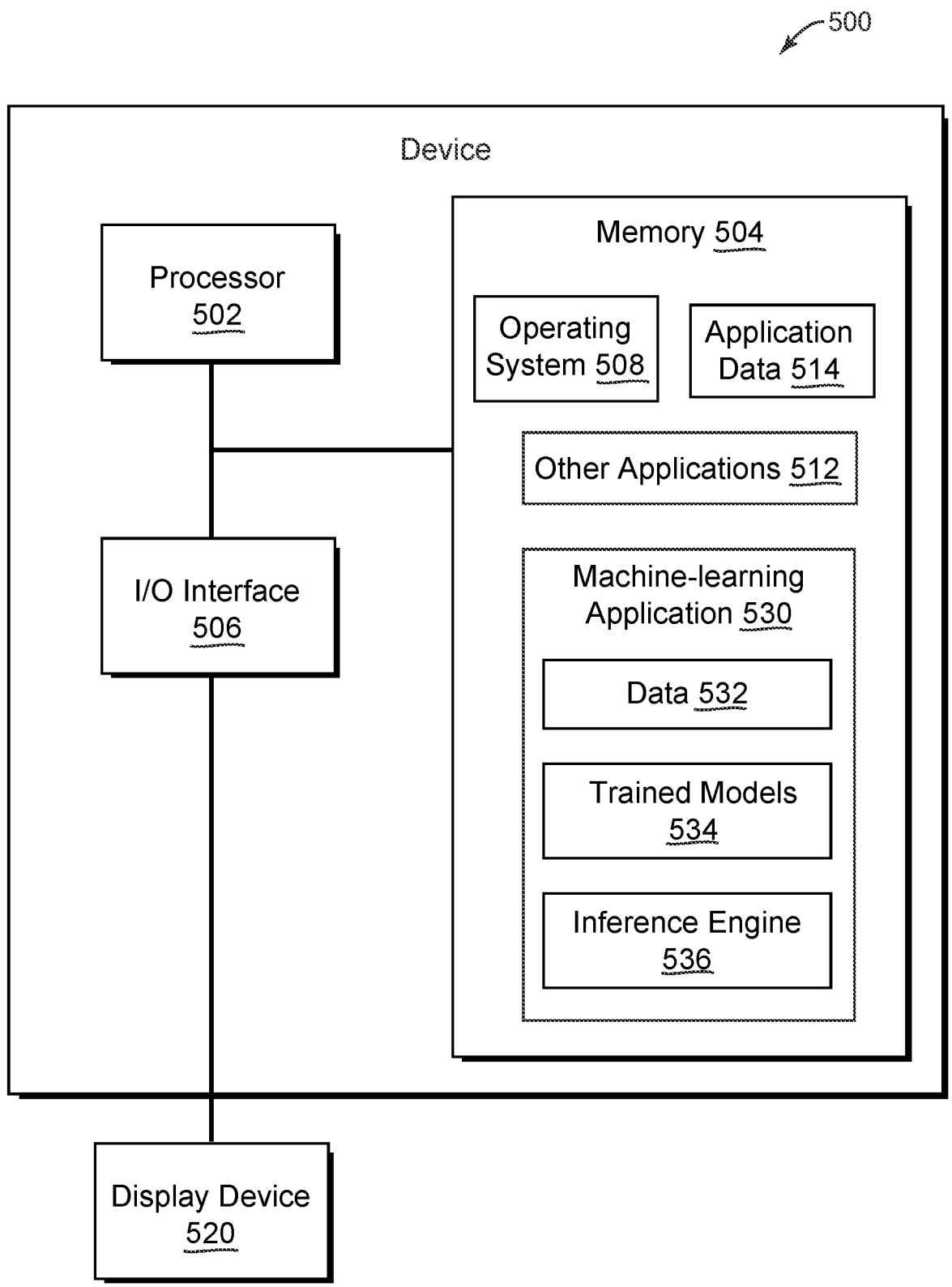
FIG. 5 is a block diagram of an example device which may be used for one or more implementations described herein.

FIG. 5 is a block diagram of an example device 500 which may be used to implement one or more features described herein. In one example, device 500 may be used to implement a client device, e.g., any of client devices 120-126 shown in FIG. 1. Alternatively, device 500 can implement a server device, e.g., server device 104, etc. In some implementations, device 500 may be used to implement a client device, a server device, or a combination of the above. Device 500 can be any suitable computer system, server, or other electronic or hardware device as described above.

One or more methods described herein (e.g., 200, 300 and/or 400) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 500 includes a processor 502, a memory 504, and I/O interface 506. Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 502 may include one or more co-processors that implement neural-network processing. In some implementations, processor 502 may be a processor that processes data to produce probabilistic output, e.g., the output produced by processor 502 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, machine-learning application 530, other applications 512, and application data 514. Other applications 512 may include applications such as a data display engine, web hosting engine, image display engine, notification engine, social networking engine, etc. In some implementations, the machine-learning application 530 and other applications 512 can each include instructions that enable processor 502 to perform functions described herein, e.g., some or all of the methods of FIGS. 2, 3, and/or 4.

The machine-learning application 530 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 530 may utilize Bayesian classifiers, support vector machines, neural networks, or other learning techniques. In some implementations, machine-learning application 530 may include trained models 534, an inference engine 536, and data 532. In some implementations, data 532 may include training data, e.g., data used to generate trained models 534. For example, training data may include any type of data suitable for training a model for estimating propagation characteristics of RF signals in an RF environment, such as signal strengths, distance and locations of transmission, geographical and atmospheric data indicating the RF environment, etc. Training data may be obtained from any source, e.g., a data repository specifically marked for training, data for which permission is provided for use as training data for machine-learning, etc. In implementations where one or more users permit use of their respective user data to train a machine-learning model, e.g., trained models 534, training data may include such user data. In implementations where users permit use of their respective user data, data 532 may include permitted data.

In some implementations, data 532 may include collected data such as propagation data, exogenous environmental data, etc. In some implementations, training data may include synthetic data generated for the purpose of training, such as data that is not based on user input or activity in the context that is being trained, e.g., data generated from simulated signal transmission, reception, and propagation in simulated RF environments, etc. In some implementations, machine-learning application 530 excludes data 532. For example, in these implementations, the trained models 534 may be generated, e.g., on a different device, and be provided as part of machine-learning application 530. In various implementations, the trained models 534 may be provided as a data file that includes a model structure or form, and associated weights. Inference engine 536 may read the data file for trained model 534 and implement a neural network with node connectivity, layers, and weights based on the model structure or form specified in trained models 534.

Machine-learning application 530 also includes one or more trained models 534. For example, such models can include physics-specific trained models and a trained meta-model as described herein. In some implementations, the trained models 534 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers.

For example, nodes of a first layer (e.g., input layer) may receive data as input data 532 or application data 514. Such data can include, for example, signal propagation data and RF environmental data, e.g., when a trained model is used for estimating propagation characteristics of RF signals. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be propagation characteristics for an RF signal in a particular RF environment, a set of labels for a model, an indication that a model is accurate or should be selected, an indication of error in an estimation of an RF propagation characteristic, etc. depending on the specific trained model. In some implementations, model form or structure also specifies a number and/or type of nodes in each layer.

In different implementations, one or more trained models 534 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, one or more trained models 534 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 532, to produce a result.

For example, training may include applying supervised learning techniques. In supervised learning, the training data can include a plurality of inputs (e.g., a set of propagation data) and a corresponding expected output for each input (e.g., one or more labels for each physics-specific model, estimated propagation characteristics of an input RF signal, etc.). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to estimate propagation characteristics that are associated with RF signals in a particular environment and/or select a particular physics-specific model for processing data, as described herein.

In another example, a model trained using unsupervised learning may cluster words based on the use of the words in data sources. In some implementations, unsupervised learning may be used to produce knowledge representations, e.g., that may be used by machine-learning application 530. In various implementations, a trained model includes a set of weights, or embeddings, corresponding to the model structure. In implementations where data 532 is omitted, machine-learning application 530 may include trained models 534 that are based on prior training, e.g., by a developer of the machine-learning application 530, by a third-party, etc. In some implementations, one or more of trained models 534 may each include a set of weights that are fixed, e.g., downloaded from a server that provides the weights.

Machine-learning application 530 also includes an inference engine 536. Inference engine 536 is configured to apply the trained models 534 to data, such as application data 514, to provide inferences, e.g., as described with reference to FIG. 4. In some implementations, inference engine 536 may include software code to be executed by processor 502. In some implementations, inference engine 536 may specify circuit configuration (e.g., for a programmable processor, for a field programmable gate array (FPGA), etc.) enabling processor 502 to apply the trained model. In some implementations, inference engine 536 may include software instructions, hardware instructions, or a combination. In some implementations, inference engine 536 may offer an application programming interface (API) that can be used by operating system 508 and/or other applications 512 to invoke inference engine 536, e.g., to apply trained models 534 to application data 514 to generate an inference.

Machine-learning application 530 may provide several technical advantages. For example, when trained models 534 are generated based on unsupervised learning, trained models 534 can be applied by inference engine 536 to produce knowledge representations (e.g., numeric representations) from input data, e.g., application data 514. For example, a model trained for RF propagation characteristic estimation may produce one or more characteristics, a model trained to select a particular specialized (e.g., physics-specific) model may produce a selection of a model, etc. In some implementations, such representations may be helpful to reduce processing cost (e.g., computational cost, memory usage, etc.) to generate an output (e.g., a label, a classification, an estimated characteristic, etc.). In some implementations, such representations may be provided as input to a different machine-learning application that produces output from the output of inference engine 536.

In some implementations, knowledge representations generated by machine-learning application 530 may be provided to a different device that conducts further processing, e.g., over a network. In such implementations, providing the knowledge representations rather than data may provide a technical benefit, e.g., enable faster data transmission with reduced cost.

In some implementations, machine-learning application 530 may be implemented in an offline manner. In these implementations, trained models 534 may be generated in a first stage, and provided as part of machine-learning application 530. In some implementations, machine-learning application 530 may be implemented in an online manner. For example, in such implementations, an application that invokes machine-learning application 530 (e.g., operating system 508, one or more of other applications 512) may utilize an inference produced by machine-learning application 530, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained models 534, e.g., to update embeddings for trained models 534.

In some implementations, machine-learning application 530 may be implemented in a manner that can adapt to particular configuration of device 500 on which the machine-learning application 530 is executed. For example, machine-learning application 530 may determine a computational graph that utilizes available computational resources, e.g., processor 502. For example, if machine-learning application 530 is implemented as a distributed application on multiple devices, machine-learning application 530 may determine computations to be carried out on individual devices in a manner that optimizes computation. In another example, machine-learning application 530 may determine that processor 502 includes a GPU with a particular number of GPU cores (e.g., 1000) and implement the inference engine accordingly (e.g., as 1000 individual processes or threads).

In some implementations, machine-learning application 530 may implement an ensemble of trained models. For example, trained models 534 may include a plurality of trained models that are each applicable to same input data. In these implementations, machine-learning application 530 may choose a particular trained model, e.g., based on available computational resources, success rate with prior inferences, etc. In some implementations, machine-learning application 530 may execute inference engine 536 such that a plurality of trained models is applied. In these implementations, machine-learning application 530 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 508 or one or more other applications 512.

In different implementations, machine-learning application 530 can produce different types of outputs. In some implementations, machine-learning application 530 may produce an output based on a format specified by an invoking application, e.g., operating system 508 or one or more other applications 512. In some implementations, an invoking application may be another machine-learning application. For example, such configurations may be used in generative adversarial networks, where an invoking machine-learning application is trained using output from machine-learning application 530 and vice-versa.

Any of software in memory 504 can alternatively be stored on any other suitable storage location or computer-readable medium. In addition, memory 504 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. Interfaced devices can be included as part of the device 500 or can be separate and communicate with the device 500. For example, network communication devices, storage devices (e.g., memory 504 and/or database 106), and input/output devices can communicate via I/O interface 506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 506 can include one or more display devices 520 and one or more data stores 538 (as discussed above). The display devices 520 that can be used to display content, e.g., a user interface of an output application as described herein. Display device 520 can be connected to device 500 via local connections (e.g., display bus) and/or via networked connections and can be any suitable display device. Display device 520 can include any suitable display device such as an LCD, LED, or plasma display screen, CRT, television, monitor, touchscreen, 3-D display screen, or other visual display device. For example, display device 520 can be a flat display screen provided on a mobile device, multiple display screens provided in a goggles or headset device, or a monitor screen for a computer device.

The I/O interface 506 can interface to other input and output devices. Some examples include display devices, printer devices, scanner devices, etc. Some implementations can provide a microphone for capturing sound, voice commands, etc., audio speaker devices for outputting sound, or other input and output devices.

For ease of illustration, FIG. 5 shows one block for each of processor 502, memory 504, I/O interface 506, and software blocks 508, 512, and 530. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

In some implementations, the prediction model can be handcrafted including hand selected functional labels and thresholds. In some implementations, a mapping (or calibration) from analysis space to a predicted precision within a result space can be performed using a piecewise linear model.

Although the description has been described with respect to particular implementations, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's or user device's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method for determining environmental-specific propagation characteristics of a radio frequency (RF) signal, the method comprising:
    receiving a plurality of first propagation characteristics of the RF signal;
    determining a feature vector based on the plurality of first propagation characteristics;
    inputting the feature vector to a machine-learning meta-model;
    executing the machine-learning meta-model to select a particular physics-specific model from a plurality of physics-specific models, wherein each of the physics-specific models is for a different RF signal propagation environment;
    inputting the feature vector to the particular physics-specific model; and
    executing the particular physics-specific model to output an estimate of one or more second propagation characteristics of the RF signal based on the feature vector.

2. The method of claim 1, wherein the first propagation characteristics include one or more of: a geographic location of a transmitter that transmitted the RF signal, a geographic location of a receiver that received the RF signal, or a distance between the transmitter and the receiver.

3. The method of claim 2, wherein the first propagation characteristics include RF environmental characteristics including one or more of: descriptions of geographical features that are located within a threshold distance of the transmitter and receiver locations, located between the transmitter and receiver locations, or located along paths of the RF signal.

4. The method of claim 3, wherein the geographical features include one or more of: geographical locations, geographical heights, geographical dimensions, geographical shapes, and/or contours of the geographical features.

5. The method of claim 1, wherein at least one physics-specific model of the physics-specific models is trained as a machine-learning model, and the method further comprises:
    training the at least one physics-specific model prior to receiving the plurality of first propagation characteristics of the RF signal.

6. The method of claim 5, wherein each of the plurality of physics-specific models is trained using a training feature vector that has the same dimensions of the feature vector, wherein the training feature vector indicates signal strength or signal attenuation of training RF signals.

7. The method of claim 1, wherein at least one of the physics-specific models is an algorithmic model.

8. The method of claim 1, further comprising pruning the feature vector to remove one or more elements having reduced applicability to the particular physics-specific model.

9. The method of claim 1, wherein the different RF signal propagation environments include at least one of: a dense clutter loss environment; a direct path through absorptive materials, or a path environment dominated by tropospheric scatter.

10. The method of claim 1, wherein the one or more second propagation characteristics include path loss for the RF signal in a particular RF signal propagation environment through which the RF signal is to propagate.

11. The method of claim 1, further comprising setting one or more parameters for RF communication based on the one or more second propagation characteristics, wherein the RF communication is to communicate the RF signal between a transmitter and a receiver.

12. The method of claim 1, further comprising training the machine-learning meta-model prior to receiving the plurality of first propagation characteristics of the RF signal, wherein training the machine-learning meta-model is based, at least in part, on output from one or more of the plurality of physics-specific models.

13. A system for determining environmental-specific propagation characteristics of a radio frequency (RF) signal, the system comprising:
    a memory storing instructions; and
    at least one processor coupled to the memory, the at least one processor configured to access the instructions from the memory to perform operations comprising:
    receiving a plurality of first propagation characteristics of the RF signal;
    determining a feature vector based on the plurality of first propagation characteristics;
    inputting the feature vector to a machine-learning meta-model;
    executing the machine-learning meta-model to select a particular physics-specific model from a plurality of physics-specific models, wherein each of the physics-specific models is for a different RF signal propagation environment;

inputting the feature vector to the particular physics-specific model; and executing the particular physics-specific model to output an estimate of one or more second propagation characteristics of the RF signal based on the feature vector.

14. The system of claim 13, wherein the first propagation characteristics include one or more of: a geographic location of a transmitter that transmitted the RF signal, a geographic location of a receiver that received the RF signal, or a distance between the transmitter and the receiver.

15. The system of claim 14, wherein the first propagation characteristics include RF environmental characteristics including one or more of: descriptions of geographical features that are located within a threshold distance of the transmitter and receiver locations, located between the transmitter and receiver locations, and/or located along paths of the RF signal.

16. The system of claim 13, wherein the at least one processor further performs an operation comprising pruning the feature vector to remove one or more elements having reduced applicability to the particular physics-specific model.

17. The system of claim 13, wherein the different RF signal propagation environments include at least one of: a dense clutter loss environment; a direct path through absorptive materials, or a path environment dominated by tropospheric scatter.

18. The system of claim 13, wherein the one or more second propagation characteristics include path loss for the RF signal in a particular RF signal propagation environment through which the RF signal is to propagate.

19. The system of claim 13, wherein the at least one processor further performs operations of:

training the plurality of physics-specific models as machine-learning models prior to receiving the plurality of first propagation characteristics of the RF signal; and training the machine-learning meta-model prior to receiving the plurality of first propagation characteristics of the RF signal.

20. A non-transitory computer readable medium having stored thereon software instructions that, when executed by a processor, cause the processor to perform operations comprising:

receiving a plurality of first propagation characteristics of a radio frequency (RF) signal;

determining a feature vector based on the plurality of first propagation characteristics;

inputting the feature vector to a machine-learning meta-model;

executing the machine-learning meta-model to select a particular physics-specific model from a plurality of physics-specific models, wherein each of the physics-specific models is for a different RF signal propagation environment;

inputting the feature vector to the particular physics-specific model; and executing the particular physics-specific model to output an estimate of one or more second propagation characteristics of the RF signal based on the feature vector.

* * * * *